US011589575B2

(12) United States Patent
Ivanovic et al.

(10) Patent No.: US 11,589,575 B2
(45) Date of Patent: Feb. 28, 2023

(54) INJECTABLE PRESERVING MEDIUM FOR PRESERVING CELLS FROM PLACENTAL BLOOD, FROM BONE MARROW AND FROM PERIPHERAL BLOOD (71) Applicants: ETABLISSEMENT FRANCAIS DU SANG, La Plaine Saint Denis (FR); UNIVERSITE DE BORDEAUX, Bordeaux (FR); CENTRE NATIONAL DE LA RECHERCHE SCIENTIFIQUE, Paris (FR)

(72) Inventors: Zoran Ivanovic, Merignac (FR); Jean Chevaleyre, Pessac (FR); Laura Rodriguez, Villenave d'Ornon (FR); Esther Attebi, Bordeaux (FR)

(73) Assignees: ETABLISSEMENT FRANCAIS DU SANG, La Plaine Saint Denis (FR); UNIVERSITÉ DE BORDEAUX, Talence (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 15/580,699

(22) PCT Filed: Sep. 9, 2016

(86) PCT No.: PCT/FR2016/052253
§ 371 (c)(1),
(2) Date: Dec. 8, 2017

(87) PCT Pub. No.: WO2017/042501
PCT Pub. Date: Mar. 16, 2017

(65) Prior Publication Data
US 2018/0184643 A1 Jul. 5, 2018

(30) Foreign Application Priority Data
Sep. 10, 2015 (FR) ..................................... 1558409

(51) Int. Cl.
*A01N 1/02* (2006.01)
(52) U.S. Cl.
CPC ......... *A01N 1/0226* (2013.01); *A01N 1/0263* (2013.01)
(58) Field of Classification Search
None
See application file for complete search history.

(56) References Cited

U.S. PATENT DOCUMENTS

| | | | | |
|---|---|---|---|---|
| 6,224,860 B1* | 5/2001 | Brown | ............... | C12N 5/0647 424/93.7 |
| 8,815,860 B2* | 8/2014 | Taylor | ............... | A61K 47/551 514/249 |
| 2008/0089947 A1 | 4/2008 | Knox et al. | | |
| 2009/0038419 A1* | 2/2009 | Hiller | ............... | C12M 33/04 73/864.73 |
| 2010/0311035 A1* | 12/2010 | Arrington | ............... | A01N 1/02 435/1.2 |
| 2011/0091936 A1* | 4/2011 | Gawlitzek | ............... | C07K 16/2878 435/69.3 |
| 2012/0128641 A1* | 5/2012 | Austen, Jr. | ............... | A01N 1/0221 424/93.7 |
| 2012/0244067 A1 | 9/2012 | Roth et al. | | |
| 2013/0064802 A1* | 3/2013 | Silverstein | ............... | A61K 38/2013 435/5 |
| 2013/0338103 A1* | 12/2013 | Ryan | ............... | A61P 35/00 514/58 |
| 2013/0344562 A1* | 12/2013 | Wimberly | ............... | G16B 15/20 435/183 |
| 2015/0306288 A1* | 10/2015 | Delorme | ............... | A61J 1/2089 435/2 |
| 2018/0116206 A1 | 5/2018 | Ivanovic et al. | | |

FOREIGN PATENT DOCUMENTS

| | | | | |
|---|---|---|---|---|
| EP | 1000541 A1 * | 5/2000 | ............... | A01N 1/02 |
| RU | 2188654 | 9/2002 | | |
| RU | 2311027 | 11/2007 | | |
| WO | WO 95/29230 | 11/1995 | | |
| WO | WO 97/41848 | 11/1997 | | |
| WO | WO 01/52647 | 7/2001 | | |
| WO | WO 02/35929 | 5/2002 | | |
| WO | WO-03068937 A2 * | 8/2003 | ............... | A61K 35/28 |
| WO | WO 2008/131973 | 11/2008 | | |
| WO | WO 09/115522 | 3/2009 | | |
| WO | WO 2010/050073 | 5/2010 | | |
| WO | WO 2016/170281 | 10/2016 | | |

OTHER PUBLICATIONS

Reich-Slotky et al. Transfusion (Jun. 2015): 1147-1153 (Year: 2015).*
Tesoriere et al. Arch. Biochem. Biophys. (1996) 326(1): 57-63 (Year: 1996).*
Burger et al. Cytotherapy (1999) 1(2): 123-133 (Year: 1999).*
Written Opinion in International Application No. PCT/FR2016/052253, dated Dec. 6, 2016, pp. 1-6.
Written Opinion in International Application No. PCT/FR2016/050948, dated Jun. 27, 2016, pp. 1-5.

* cited by examiner

*Primary Examiner* — Susan M Hanley
(74) *Attorney, Agent, or Firm* — Saliwanchik, Lloyd & Eisenschenk (57) ABSTRACT

The present invention relates to a solution for the preservation of cells from placental blood, from bone marrow and from peripheral blood.

13 Claims, 6 Drawing Sheets

INJECTABLE PRESERVING MEDIUM FOR PRESERVING CELLS FROM PLACENTAL BLOOD, FROM BONE MARROW AND FROM PERIPHERAL BLOOD

CROSS-REFERENCE TO RELATED APPLICATION

This application is the U.S. national stage application of International Patent Application No. PCT/FR2016/052253, filed Sep. 9, 2016.

FIELD OF THE INVENTION

The present invention relates to the medical field, and in particular to media for preserving cells from placental blood, from bone marrow and from peripheral blood.

BACKGROUND OF THE INVENTION

Placental blood stem cells are an alternative to bone marrow grafts. Patients not having a compatible donor who is related or on the national register of bone marrow donors can then benefit from the grafting of one or two units of placental blood. The advantage of this alternative is that these cells circumvent the need for a very high level of HLA compatibility between the patient and the graft cells.

Between the steps of collecting placental blood units and the freezing thereof, recommendations in force stipulate a period of only 24 hours since the viability and functionality of stem cells and progenitors are reduced a 4° C. An extension of this period would make it possible to collect placental blood units at weekends, but also to lengthen the distance between the place of collection and the place of storage.

Also, ex vivo amplification of CD34+ cells, in particular those of placental blood, has been developed over these last 15 years (Duchez et al, 2003, *J Hematother Stem Cell Res*, 12, 587-9; Duchez et al, 2012, *Cell Transplant*, 21, 2517-21; Ivanovic et al, 2004, *Stem Cells*, 22, 716-24; Ivanovic et al, 2006, *Transfusion*, 46, 126-31; Ivanovic et al, 2011, *Cell Transplant*, 20, 1453-63; Polini et al, 1997, *Hematol Cell Ther*, 39, 49-58; Boiron et al, 2006, *Transfusion*, 46, 1934-42; Milpied et al, 2009, *ASH Meeting abstracts, Blood*, 114, Abst 502, p. 207). It allows the forming of haematopoietic grafts having two advantages: maintaining graft potential over the long term and reducing the post-packaging aplasia period.

The clinical phase of the GRAPA protocol (Greffe Allogénique de Progéniteurs Amplifiés—allogeneic grafting of amplified progenitors) for the ex vivo expansion of placental blood CD34+ cells, showed the therapeutic advantage of this technology which allows the long-term regeneration of medullar cells whilst shortening the post-graft aplasia period (Milpied et al, supra).

However, for the preparation of grafts, the cells contained in a non-injectable preserving or culture medium are washed and then resuspended in a 4% solution of human albumin for injection into patients within a period of 6 hours, this only allowing transport over a short distance (less than 50 kilometres). Longer periods are associated with a major loss of functionality of the progenitors used and of HSCs (Duchez et al, 2013, *Cell Transplant*, 22, 1501-6).

Studies have shown the possibility of proper preserving of these cells after culture for a period of 48 h at +4° C. in a preserving medium (HP02 medium, Macopharma) that is non-injectable in man (Duchez et al, supra). To the knowledge of the inventors, this is the only medium currently known to have such capacity. However, this medium is non-injectable and washing is required before grafting.

Most solutions for preserving human cells or organs are not injectable since they contain molecules that are not included in the Codex. These molecules are not listed because they are not of therapeutic advantage, do not attract the interest of pharmaceutical suppliers or because they are toxic for patients. For example, this list being non-exhaustive, the media comprise polyethylene glycol, Trolox (6-hydroxy-2,5,7,8-tetramethylchroman-2-carboxylic acid), sodium erythorbate, glutathione, a dismutase superoxide, catalase, polyoside selected from among lactobionate, sucrose, raffinose and trehalose, a phosphate buffer (in particular $Na_2PO_4$, $K_2PO_4$, $NaHPO_4$, or $KHPO_4$), HEPES buffer and ketoglutarate.

The setting up of competent regional, national, or all the more so international centres for this type of cell production and/or storage requires the possible transport of these grafts over long distances, within Europe or even on other continents, these grafts being properly preserved and able to be injected without prior washing. Washing involves relative long handling operations necessitating dedicated equipment and staff.

In this context, there is therefore a need to have available an injectable preserving medium.

SUMMARY OF THE INVENTION

The present invention provides a preserving solution that is injectable and has good preservation qualities of cells and the functionality thereof, for at least 48 h.

It therefore relates to an injectable solution for preserving cells from placental blood, from bone marrow and from peripheral blood, the solution comprising a physiological saline solution of sodium chloride, potassium chloride, magnesium sulfate, sodium bicarbonate, vitamin E and/or A, and human albumin. Preferably, it comprises at least 5 g/l of human albumin and at least 0.0000255 g/l of vitamin E and/or at least 0.0000026 g/l of vitamin A.

Optionally, the solution may also comprise lactate and vitamin C. In this embodiment, it contains at least 0.0003125 g/l of vitamin C.

The solution may further comprise one or more elements selected from among amino acids including glutamine, glucose, mannitol, and citric acid.

In one preferred embodiment, the injectable solution comprises or essentially consists of a physiological saline solution of sodium chloride, human albumin, vitamins E, C and A, amino acids including glutamine, potassium and magnesium ions, glucose, mannitol, lactate, sodium bicarbonate and citric acid.

The present invention also relates to a kit comprising an injectable preserving solution according to the present invention and a sterile container intended to receive cells from placental blood, from bone marrow and from peripheral blood.

It further relates to a sterile container intended to receive cells from placental blood, from bone marrow and from peripheral blood comprising the injectable preserving medium of the present invention. Optionally, the container may further comprise cells from placental blood, from bone marrow and from peripheral blood. Preferably, the cells comprise $CD34^+$ cells.

The present invention relates to the use of the injectable solution according to the present invention, of a kit according to the present invention or of a container according to the present invention to preserve cells from placental blood, from bone marrow and from peripheral blood, preferably under moderate hypothermia, in particular at 4° C. Preferably, the cells comprise $CD34^+$ cells.

Finally, the present invention concerns a method for preserving cells from placental blood, from bone marrow and from peripheral blood, comprising the contacting of the cells from placental blood, from bone marrow and from peripheral blood with the injectable solution according to the present invention. Preferably, the cells comprise $CD34^+$ cells.

DETAILED DESCRIPTION OF THE INVENTION

The present invention therefore relates to a solution for preserving cells from placental blood, from bone marrow and from peripheral blood, this preserving solution being injectable. The cells from placental blood, from bone marrow and from peripheral blood, may be native (after collection), unfrozen or amplified ex vivo. By "injectable solution for preserving cells from placental blood, from bone marrow and from peripheral blood" it is meant that the solution is adapted for injection and adapted for the preservation of said cells.

By "injectable" it is meant in the present application that the preserving solution is adapted for injection (e.g. intravenous, intramuscular, subcutaneous, etc. . . . ) into a human being without prior rinsing of the cells. Therefore, the solution only contains elements that are recognized or authorized as being "injectable" by authorities monitoring the safety of medicinal products such as the FDA (Food and Drug Administration), European Medicines Agency (EMA) or the French national agency for the safety of medicinal and health products (Agence nationale de sécurité du médicament et des produits de santé—ANSM). Thus, it does not contain any element that is non-recognized or non-authorized as "injectable" by the FDA (Food and Drug Administration), European Medicines Agency (EMA) of French national agency for the safety of medicinal and health products (ANSM). In particular the VIDAL® dictionary (2015 edition) can be consulted to determine whether an element is authorized or recognized as being "injectable".

The reference medium used to develop the injectable preserving solution of the present invention is the HP02 medium by Macopharma (also called MC01). The composition of this medium is secret. However, patent application WO2014/057220 describes constituent elements thereof (page 13, line 25-page 14, line 4). This medium is clearly non-injectable. In particular, it comprises HEPES buffer and sodium pyruvate, neither of which is authorized to be injectable.

The preserving medium of the present invention has equivalent preservation efficacy to this reference medium HP02, whilst being injectable. In particular, it allows preservation for at least 48 h at 4° C., and even for 72 h, whilst maintaining viability and functionality of the stem and progenitor cells compatible with therapeutic use.

The preserving solution of the present invention comprises a physiological saline solution (particularly sodium chloride), human albumin and vitamin E. Alternatively, the preserving solution of the present invention comprises a physiological saline solution (in particular sodium chloride), human albumin and vitamin A, the latter having a role close to that of vitamin E.

Human albumin plays a major role in stabilising the medium, particularly under accelerated ageing conditions at 37° C. Human albumin is commercially available in injectable quality, in particular from Baxter or under the trade names Albunorm®, Flexbumin®, Vialebex® or Ydralbum®. The solution comprises at least 1 g/l of albumin, preferably at least 5, 10 or 15 g/l. The amount of human albumin in the solution may be between 1 and 100 g/l of solution, preferably between 5 and 40 g/l of solution, more preferably between 5 and 20 g/l, and further preferably 15 g/l of solution. In other words, the solution comprises 0.1 to 10% of human albumin, preferably 0.5 to 4%, more preferably 0.5 to 2%, and further preferably 1.5%.

The solution also comprises vitamin E and/or vitamin A. Preferably the solution at least comprises vitamin E. Most surprisingly, the inventors have indeed discovered that vitamin E (alpha-tocopherol) has a very important effect on cell preservation, in particular on the functionality thereof. Vitamin E has even been identified by the inventors as being the element that has the greatest action. The solution comprises at least 0.0000255 g/l of vitamin E. The amount of vitamin E in the solution may particularly be between 0.0001 and 0.01 g/l of solution, preferably between 0.001 and 0.006 g/l of solution, and most particularly 0.004 g/l of solution. This product is commercially available in injectable quality, in particular from Nepalm.

Preferably, the solution further comprises vitamin C. The solution then comprises at least 0.000312 g/of vitamin C. The amount of vitamin C in the solution is between 0.0005 and 0.15 g/l of solution, preferably between 0.001 and 0.1 g/l of solution, and most particularly it is 0.05 g/l of solution. This product is commercially available in injectable quality in particular in the form of Vitamin C Aguettant.

Preferably, the solution further comprises vitamin A. The solution then comprises at least 0.0000026 g/l of vitamin A. The amount of vitamin A in the solution is between 0.0001 and 0.001 g/l of solution, preferably between 0.0002 and 0.0008 g/l of solution, and most particularly it is 0.0004 g/l of solution. This product is commercially available in injectable quality in particular from Nepalm.

In one particular embodiment, the solution comprises vitamins E and C, vitamins E and A, or vitamins E, C and A. In particular, the vitamins may be introduced in the solution of the present invention through the addition of a cocktail of vitamins that is commercially available and adapted for injection. For example, this list not being exhaustive, the cocktail of vitamins may be Cervenit® by Baxter which comprises retinol palmitate, cholecalciferol, alpha-tocopherol, ascorbic acid, thiamine, riboflavin, pyridoxine, cyanocobalamin, folic acid, pantothenic acid, biotin and nicotinamide; or Vitalipide® by Fresenius Kabi which comprises palmitate, alpha-tocopherol, vitamin D2 and vitamin K1.

The physiological saline solution is a conventional sodium chloride solution, in particular at 0.9%. It is contained in the solution in amounts that are physiologically acceptable. Preferably, sodium chloride may be contained in an amount of between 5 and 7 g/l, and preferably it is about 6 g/l.

Preferably, the solution of the present invention further comprises potassium ions ($K^+$) and magnesium ions ($Mg^{2+}$), preferably in physiological amount. In particular, the solution comprises potassium chloride, preferably in physiological amount (i.e. about 0.33 g/l). It also comprises magnesium sulfate, preferably in an amount of between 0.01 and 3 g/l, preferably between 0.05 and 2.4 g/l, in particular about 0.1 g/l. The solution may also comprise calcium ions.

The preserving solution of the present invention may further comprise sodium bicarbonate. Preferably it is contained in the solution in an amount of between 0.1 and 4.5 g/l, preferably between 0.25 and 4.15 g/l, and in particular it is about 0.52 g/l. This product is commercially available in injectable quality.

The preserving solution of the present invention may further comprise lactate, in particular Ringer lactate. This product is commercially available in injectable quality, in particular from Macopharma, Fresenius Kabi or Baxter. Ringer lactate is contained in the solution so that the content of sodium lactate is between 0.1 and 3 g/l, preferably between 0.2 and 2.7 g/l, and in particular about 0.7 g/l.

The preserving solution of the present invention may further comprise citric acid, in particular ACD A (Citric Acid, Citrate, Dextrose, solution A).

Preferably, the solution of the present invention further comprises amino acids. The amino acids can be contained in amounts of between 1 and 4 g/l, preferably between 1.3 and 3.3 g/l, in particular about 2 g/l. Several amino acid cocktails are commercially available in injectable quality, for example Vaminolact® by Fresenius Kabi. Among the amino acids, it is of interest that the solution should contain glutamine, in particular in amounts of glutamine of between 0.2 and 0.8 g/l, preferably between 0.3 and 0.7 g/l, and in particular about 0.7 g/l. The glutamine can be introduced through the use of commercially available products for injection such as Dipeptiven® by Fresenius Kabi.

The preserving solution of the present invention may further comprise glucose. It is conventionally used in an amount of about 1 g/l.

The preserving solution of the present invention may further comprise mannitol. For example, the mannitol content may be between 1 and 25 g/l, preferably between 5 and 20 g/l, and in particular about 5 g/l.

Therefore, in alternative embodiments the injectable preserving solution of the present invention comprises or essentially consists of:
- a physiological saline solution of sodium chloride, potassium chloride, magnesium sulfate, sodium bicarbonate, human albumin and vitamin E;
- a physiological saline solution of sodium chloride, potassium chloride, magnesium sulfate, sodium bicarbonate, human albumin and vitamin A;
- a physiological saline solution of sodium chloride, potassium chloride, magnesium sulfate, sodium bicarbonate, human albumin and vitamins E and C;
- a physiological saline solution of sodium chloride, potassium chloride, magnesium sulfate, sodium bicarbonate, human albumin and vitamins A and C;
- a physiological saline solution of sodium chloride, potassium chloride, magnesium sulfate, sodium bicarbonate, human albumin and vitamins E and A;
- a physiological saline solution of sodium chloride, potassium chloride, magnesium sulfate, sodium bicarbonate, human albumin and vitamins E, C and A;
- a physiological saline solution of sodium chloride, potassium chloride, magnesium sulfate, sodium bicarbonate, human albumin, vitamin E and one or more components selected from the group formed by lactate, amino acids including glutamine, glucose, mannitol, and citric acid;
- a physiological saline solution of sodium chloride, potassium chloride, magnesium sulfate, sodium bicarbonate, human albumin, vitamin A and one or more components selected from the group formed by lactate, amino acids including glutamine, glucose, mannitol, and citric acid;
- a physiological saline solution of sodium chloride, potassium chloride, magnesium sulfate, sodium bicarbonate, human albumin, vitamins E and C, and one or more components selected from the group formed by lactate, amino acids including glutamine, glucose, mannitol, and citric acid;
- a physiological saline solution of sodium chloride, potassium chloride, magnesium sulfate, sodium bicarbonate, human albumin, vitamins A and C, and one or more components selected from the group formed by lactate, amino acids including glutamine, glucose, mannitol, and citric acid;
- a physiological saline solution of sodium chloride, potassium chloride, magnesium sulfate, sodium bicarbonate, human albumin, vitamins E and A, and one or more components selected from the group formed by lactate, amino acids including glutamine, glucose, mannitol, and citric acid;
- a physiological saline solution of sodium chloride, potassium chloride, magnesium sulfate, sodium bicarbonate, human albumin and vitamins E, C and A, and one or more components selected from the group formed by lactate, amino acids including glutamine, glucose, mannitol, and citric acid.

Preferably, each component is contained in the amounts given in the Table below.

TABLE 1

| Component/Quantity | (g/l solution) | | |
| --- | --- | --- | --- |
| | Minimum | Maximum | Preferred |
| Albumin | 5 | 40 | 15 |
| Vitamin E | 0.0000255 | 0.01 | 0.004 |
| Vitamin C | 0.0003125 | 0.1 | 0.05 |
| Vitamin A | 0.0000026 | 0.001 | 0.0005 |
| Glucose | 1 | 1 | 1 |
| Mannitol | 1 | 20 | 5 |
| Amino acids | 1 | 4 | 1.5-2.5 |
| Including glutamine | 0.1 | 1 | 0.4-0.7 |
| Sodium bicarbonate | 0.1 | 5 | 0.5-0.6 |
| Potassium chloride | Physiological saline (0.33) | | 0.33 |
| Sodium chloride | Physiological saline (6) | | 6 |
| Magnesium sulfate | 0.05 | 2.35 | 0.1 |
| Sodium lactate | 0.1 | 3 | 0.7 |
| Citrate ions | 0.019 | 0.57 | 0.057 |

By "essentially consists of" it is meant that the solution may comprise components other than those listed, but in an amount of less than 10% by weight, preferably less than 5, 4, 3, 2 or 1%. It is understood that these other components are compatible with injection.

In one particularly preferred embodiment, the preserving solution of the present invention comprises human albumin, amino acids, potassium chloride, glucose, glutamine, magnesium sulfate, vitamins E, C and A, mannitol, lactate preferably Ringer lactate, sodium chloride, sodium bicarbonate, and citric acid in particular in ACD A form.

By "about" it is meant ±10%, preferably ±5%. For example, about 10 means between 9 and 11, and preferably between 9.5 and 10.5.

Therefore, the preserving medium of the present invention, so that it can be injectable, does not contain any element non-authorized by medicinal product monitoring agencies in particular the FDA, ANSM and EMA. In particular, the preserving solution of the present invention does not contain one or more elements selected from the group formed by polyethylene glycol, Trolox (6-hydroxy-2,5,7,8-tetramethylchroman-2-carboxylic acid), sodium erythorbate, glutathione, a superoxide dismutase, catalase, polyoside in particular selected from among lactobionate, sucrose, raffinose and trehalose, a phosphate buffer (in particular $Na_2PO_4$, $K_2PO_4$, $NaHPO_4$, or $KHPO_4$), and ketoglutarate. In one preferred embodiment, the solution does not comprise any element in this list. In one preferred embodiment, the injectable preserving solution of the present invention does not comprise phenol red, iron gluconate, human insulin and/or nucleosides. In one preferred embodiment, the preserving medium of the present invention does not comprise a vanadium compound such as oxovanadium, bis(maltolato) oxovanadium and orthovanadium.

The present invention therefore relates to the use of the injectable preserving solution according to the present invention to preserve cells from placental blood, from bone marrow and from peripheral blood, in particular $CD34^+$ cells.

The present invention also relates to a kit comprising the injectable preserving solution according to the present invention and a sterile container intended to receive the cells from placental blood, from bone marrow and from peripheral blood, in particular $CD34^+$ cells. It also relates to a sterile container intended to receive cells from placental blood, from bone marrow and from peripheral blood containing the injectable preserving solution of the present invention. Finally, it relates to the use of a kit or container containing the injectable preserving solution of the present invention to preserve cells from placental blood, from bone marrow and from peripheral blood, in particular $CD34^+$ cells.

The sterile container is formed of an air-barrier film and/or arranged in packaging made of air-barrier film. The air-barrier film is an oxygen-barrier film or an oxygen- and carbon dioxide-barrier film. The film can be made of PVC (polyvinyl chloride). Alternatively, it may comprise an ethylene-vinyl alcohol copolymer (EVOH), a copolymer of vinylidene chloride, polyvinyl alcohol, polyacrylonitrile, an ethylene vinyl acetate copolymer (EVA) or polyamide. In one preferred embodiment, the container is formed of a film comprising EVA or PVC. In particular, the air-barrier film has a multilayer structure such as tri-layer structure of which the central layer is in air-barrier material. The central layer is sandwiched between two layers of another material such as a polyolefin, particularly polyethylene, polypropylene or an ethylene-olefin copolymer. For example, the film is a tri-layer film in ethylene-vinyl acetate/ethylene-vinyl alcohol/ethylene-vinyl acetate (EVA/EVOH/EVA).

The present invention also relates to a method for preserving cells from placental blood, from bone marrow and from peripheral blood, comprising the contacting of these cells with the injectable preserving solution according to the present invention. Preferably, the cells comprise $CD34^+$ cells. It also relates to a method for preserving $CD34^+$ cells comprising the contacting of these cells with the injectable preserving solution according to the present invention.

Preferably, the preserving solution is contacted with the cells in a volume ratio of between 1:0.5 and 1:2. This ratio is particularly pertinent for collected placental blood, bone marrow and peripheral blood. On the other hand, regarding mononucleated cells, fresh or frozen CD34+ cells, particularly those selected from collected placental blood, bone marrow and peripheral blood, and cells obtained after ex vivo amplifications, these are resuspended in the preserving solution at varying cell concentrations depending on protocols and needs. Preferably, the cells are stored at a temperature of between 0° C. and 10° C., preferably at about 4° C.

The present invention also relates to a sterile container intended to receive cells from placental blood, from bone marrow and from peripheral blood, containing the injectable preserving solution of the present invention and the cells from placental blood, from bone marrow and from peripheral blood. Preferably, the cells comprise $CD34^+$ cells. It also relates to a sterile container intended to receive $CD34^+$ cells containing the injectable preserving solution of the present invention and $CD34^+$ cells. Therefore, the container may optionally be considered as containing a graft ready for injection.

Preferably, the cells are mammalian cells, and most particularly preferred are human cells. In particular, the cells are not embryonic human cells.

The cells to be preserved are cells such as collected or optionally such as obtained after ex vivo expansion. The cells of particular interest are CD34+ cells, and more specifically hemopoietic stem cells and progenitor cells.

In one preferred embodiment, the cells to be preserved are placental blood cells.

The cells to be preserved may be cells that have been directly collected, cells obtained by ex vivo cell amplification or cells that have been frozen.

According to one preferred embodiment, the cells are cells intended to be transplanted into a host and have preferably been collected from a donor. The donor and the host may be the same individual (autologous graft) or different individuals (allogeneic graft).

The present invention also relates to a graft comprising cells intended to be transplanted and the injectable preserving solution of the present invention. Preferably, the cells intended to be transplanted are cells from placental blood, from bone marrow and from peripheral blood. In particular the cells comprise $CD34^+$ cells.

The present invention also relates to a method for treating a patient, comprising the injection of the graft such as defined above. The injection may be an intravenous, subcutaneous, intramuscular injection, including intra-cardiac injection.

All the references cited in this description are incorporated by reference in the present application. Other characteristics and advantages will become better apparent on reading the following examples that are given for illustration purposes and are nonlimiting.

DESCRIPTION OF THE FIGURES

FIG. 1. Preservation yield of amplified $CD34^+$ cells from placental blood, stored 48 h at 4° C. (n=12). For each condition, on the left, the TNC yield (total viable nucleated cells) and on the right the CFU (colony forming unit) allow evaluation of clonogenic functionality. The tested conditions were the following: D10 (end of culture), 4% HSA (medium comprising 4% human serum albumin), HP02 (reference medium by Macopharma), Formula 12 components (such as described in the examples in Table 2), without HSA (Formula 12 medium without human serum albumin), without Vits C,E,A (Cernevit®) (Formula 12 medium without Cernevit®), Vit C alone (Formula 12 medium without Cernevit® and with vitamin C), Vit E alone (Formula 12 medium without Cernevit® and with vitamin E), and Vit A alone (Formula 12 medium without Cernevit® and with vitamin A). Apart from D10, the other measurements are taken after 48 h storage of the cells at 4° C. The assays were conducted in gas-impermeable containers (2.5 ml capacity polypropylene tubes with de 2.5 ml of cell suspension for maximum avoidance of the presence of air).

FIG. 3. Preservation yield of amplified CD34+ cells from placental blood, stored 72 h at 4° C. (n=11). For each condition, on the left, the TNC yield (total viable nucleated cells) and on the right the CFU yield (colony forming units) allowing evaluation of clonogenic functionality. The tested conditions were the following: D10 (end of culture); M8 NaCl (medium comprising human serum albumin, amino acids, potassium chloride, glucose, glutamine, sodium bicarbonate, ACD A and 0.9% NaCl) with or without the addition of Cernevit®; M8 RL (medium comprising human serum albumin, amino acids, potassium chloride, glucose, glutamine, sodium bicarbonate, ACD A, and Ringer Lactate instead of 0.9% NaCl) with or without the addition of Cernevit®; M8 NaCl without HSA (M8 NaCl devoid of human albumin serum) with or without the addition of Cernevit®; M8 NaCl without AA (M8 NaCl devoid of amino acids) with or without the addition of Cernevit®; M8 NaCl without KCl (M8 NaCl devoid of KCl) with or without the addition of Cernevit®; M8 NaCl without GG (M8 NaCl devoid of glucose and glutamine) with or without the addition of Cernevit®; M8 NaCl without AAGG (M8 NaCl devoid of amino acids, glucose and glutamine) with or without the addition of Cernevit®; SEC 4 NaCl (components of Formula 12 medium without Ringer Lactate); SEC 4 RL (components of Formula 12 medium without 0.9% NaCl); HP02 (reference medium by Macopharma). The assays were conducted in gas-impermeable containers (2.5 ml capacity polypropylene tubes containing 2.5 ml of cell suspension for maximum avoidance of the presence of air).

FIG. 5. Preservation yield of amplified CD34+ cells from placental blood, stored for 48 h at 4° C. (n=9). For each condition, on the left, the TNC yield (total viable nucleated cells) and on the right the CFU yield (colony forming units) allowing evaluation of clonogenic functionality. The tested conditions were the following: D10 (end of culture); HP02 (reference medium by Macopharma); standard SEC (0.5% HSA) (SEC medium such as described in the examples in Table 2); SEC Mannitol (depleted of NaCl) (components of Formula 12 medium without 0.9% NaCl replaced by an identical volume of 4.55% mannitol [300 mos]); SEC Glucose (depleted of NaCl) (components of Formula 12 medium without 0.9% NaCl replaced by an identical volume of 5% glucose solution); SEC 3% HSA (SEC medium such as described in the examples in Table 2 but with 3% human serum albumin); SEC PVC pouch (the container here is a 20 ml gas-permeable sampling pouch in PVC). The assays were conducted in gas-impermeable containers (2.5 ml capacity polypropylene tubes containing 2.5 ml of cell suspension for maximum avoidance of the presence of air) except with the PVC pouch.

FIG. 6. Preservation yield of amplified CD34+ cells from placental blood, stored for 48 h at 4° C. (n=8) for a study on a range of CERNEVIT® volumes (and hence a molarity range of vitamin E) added to the «basic» SEC medium composed of 11 other components. The tested conditions were the following: Human serum albumin (4% HSA); HP02 (reference medium by Macopharma); «basic» SEC without CERNEVIT®; then «basic» SEC supplemented with decreasing volumes of CERNEVIT®, namely: 10 ml/l per 45 µM of vitamin E; 5 ml/l per 22.5 µM of vitamin E; 2 ml/l per 9 µM of vitamin E; 1 ml/l per 4.5 µM of vitamin E; 0.5 ml/l per 2.25 µM of vitamin E; 0.2 ml/l per 0.9 µM of vitamin E; 0.1 ml/l per 0.45 µM of vitamin E 0.05 ml/l per 0.225 µM of vitamin E; 0.025 ml/l per 0.112 µM of vitamin E. The assays were conducted in gas-impermeable containers (2.5 ml capacity polypropylene tubes containing 2.5 ml of cell suspension for maximum avoidance of the presence of air).

FIG. 8. Preservation yield of the clonogenicity (CFU) of amplified CD34+ cells after storage in SEC medium at +4° C. for 48 h followed by primary grafting in NSG immunodeficient mice. The operations of this study consisted in different steps: graft production: placing in culture of CD34+ cells from placental blood (selected via immunomagnetic sorting) in a medium containing a cocktail of adapted cytokines for a period of 12 days. After culture, the amplified cells were harvested and divided into two parts: one part was grafted onto a batch of immunodeficient mice, each mouse receiving a quantity of amplified cells produced by 1000 CD34+ cells on start of culture; the other part was placed in SEC preserving medium (PVC pouch) at +4° C. for 48 h then injected into a second batch of immunodeficient mice under the same quantitative conditions. 8 weeks after grafting, the mice were sacrificed, the human clonogenic progenitors were analysed in the bone marrow of the mice: these progenitors are generated by the stem cells (key to graph: 1 circle corresponds to a grafted, analysed mouse (CFU/femur); the dotted line corresponds to the mean; the solid line corresponds to the median).

EXAMPLES

After finding a certain number of active ingredients in the Codex, the inventors selected injectable pharmaceutical preparations that they associated together to obtain a basic formulation that was subsequently assayed in comparison with the HP02 reference medium (Macopharma). The preservation results obtained after a storage time of 48 h and 72 h at +4° C. were practically identical for both media.

The inventors therefore tested the advantage of each product and set out to determine the optimal effective concentration. Some components were excluded from the initial formulation either on account of no global action (SeNa), or because of possible recently recognized renal toxicity (6% Hydroxy-Ethyl-Starch).

The inventors therefore evidenced the importance of vitamin E (Alpha-Tocopherol) and to a lesser extent that of vitamins A (Retinoic Acid) and C (Ascorbic Acid), of K+, Mg++ ions, and of Lactate and human albumin on the maintaining of viability and above all on the functionality (clonogenicity) of amplified CD34+ cells.

Finally, the components of 12 pharmaceutical preparations were included in the formulation of the cell preserving biological medium. The preserving medium was prepared under sterile conditions in an EVA plastic pouch (Ethylene vinyl acetate) impervious to gases to prevent entry of atmospheric gases, in particular of dioxygen ($O_2$), and especially so that the carbon dioxide ($CO_2$) dissolved during pH adjustment (action of citric acid on Na bicarbonate) remained in the medium (promoting cell preservation at low temperature); thereby the pH of the medium therefore remains at the desired value for a period of several years. These pouches are used in the pharmaceutical industry to package injectable preparations, and by suppliers of biological reagents for the preservation inter alia of culture media.

The inventors called this preserving medium SEC.
Description of the Preserving Medium
Injectable Products Used Product C1: Human albumin 20% solution (composition: human album 200 gr; caprylic acid qs 1 litre): it has a protective role for some molecules; during our assays it exhibited a very distinct role in maintaining the viability of total nucleated cells; it allows better stability of the pH of the formulated medium in containers that are not gas-impermeable during storage of amplified cells at +4° C. (See FIG. 1)

Figure 3:
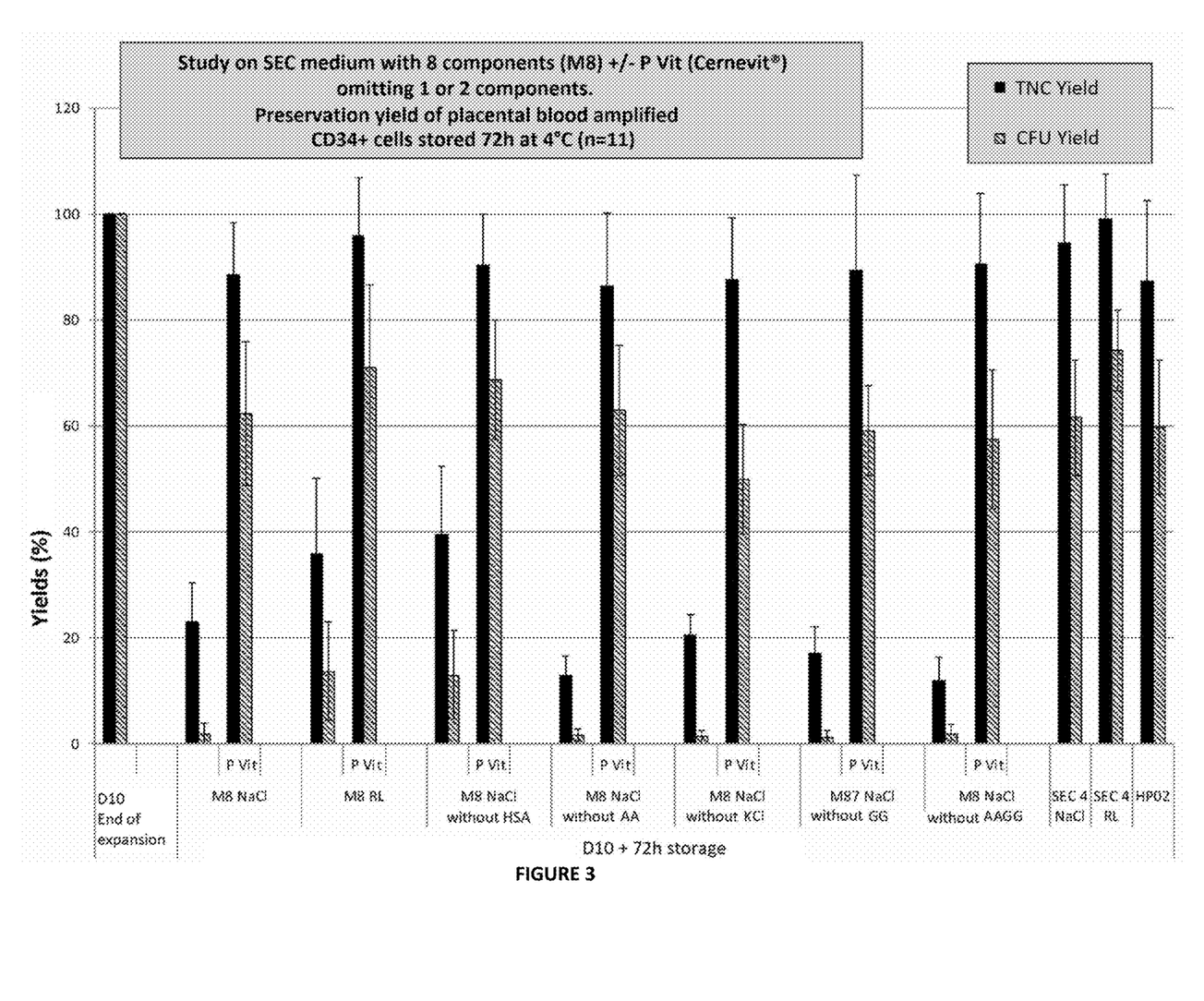

Product C2: Amino acids (Vaminolact® (Fresenius Kabi) composition qs 100 ml: L-Alanine 630 mg; L-Arginine 410 mg; L-Aspartic Acid 410 mg; L-Cysteine/L Cystine 410 mg; L-Glutamic Acid 710 mg; Glycine 210 mg; L-Histidine 210 mg; L-Isoleucine 310 mg; L-Leucine 700 mg; L-Lysine 560 mg; L-Methionine 130 mg; L-Phenylalanine 270 mg L-Proline 560 mg; L Serine 380 mg L-Taurine 30 mg; L-Threonine 360 mg; L-Tryptophan 140 mg; L-Tyrosine 50 mg; L-Valine 360 mg.) Amino acids make a non-significant contribution to improvement in functionality of the amplified cells, but one that is of interest however especially as some amino acids may have a protective role on the cells. (See FIG. 3)

Product C3: KCl (10% preparation in $H_2O$): throughout our assays, it showed signification action on the preserving of the functionality of amplified cells. (See FIG. 3)

Product C4: Glucose (30% preparation): throughout out assays, it showed non-significant action but one of interest. (See FIG. 3).

Product C5: Glutamine amino acid (Dipeptiven Composition (Fresenius Kabi): Alanyl-Glutamine 20 g/100 ml i.e. 13.2 g of Glutamine/100 ml; molecule stable versus glutamine): throughout our assays, it exhibited action that was non-significant but of interest; it would seem to have protective action on mitochondria. (See FIG. 3)

Figure 4:
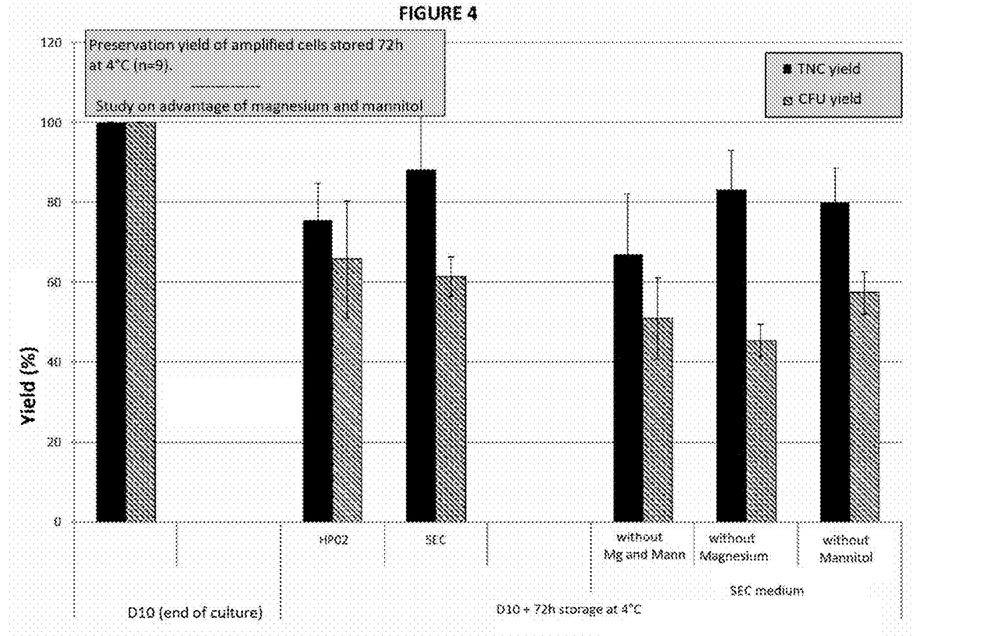
FIG. 4. Preservation yield of amplified CD34+ cells from placental blood, stored 72 h at 4° C. (n=9). For each condition, on the left, the TNC yield (total viable nucleated cells) and on the right the CFU yield (colony forming units) allowing evaluation of clonogenic functionality. The tested conditions were the following: D10 (end of culture); HP02 (reference medium by Macopharma); SEC (SEC medium such as described in the examples in Table 2); without Mg and Mann (SEC medium but without magnesium and mannitol); without Magnesium (SEC medium but without magnesium); without Mannitol (SEC medium but without mannitol). The assays were conducted in gas-impermeable containers (2.5 ml capacity polypropylene tubes containing 2.5 ml of cell suspension for maximum avoidance of the presence of air).

Product C6: $MgSO_4$ (15% preparation in $H_2O$); throughout our assays, it showed significant action on the preserving of the functionality of amplified cells; it would seem to have a role on the mitochondria. (See FIG. 4)

Products C7: Anti-Oxidants

Either C7.Cernevit® (Baxter) (Composition for 5 ml: Retinol [Vitamin A] 3500 IU in the form of retinol palmitate; Cholecalciferol [Vitamin D3] 220 IU; Alpha-tocopherol or [Vitamin E] 11.2 IU i.e. 10.2 mg; Ascorbic Acid [Vitamin C] 125 mg; Thiamine [Vitamin B1] 3.51 mg; Riboflavin [Vitamin B2] 4.14 mg); Pyridoxine [Vitamin B6] 4.53 mg; Cyanocobalamin [vitamin B12] 0.006 mg; Folic acid [Vitamin B9]; Pantothenic acid [Vitamin B5] 17.15 mg; Biotin [Vitamin B8] 0.069 mg; Nicotinamide [Vitamin PP] 46 mg): throughout our assays, it exhibited preserving action on the functionality of the cells stored at +4° C. Among the vitamins assayed separately, vitamin E exhibited the most important action; vitamins A and C have lesser action but vitamin C is described as having a protective role on vitamin E; the addition of Cernevit® to the culture supernatant showed an identical effect to that of the formulated medium in the preservation of amplified cells at +4° C. Finally, each vitamin exists in the form of an injectable medicinal product and vitamins E and C only could be used in the formulation.

Or C7a.Vitamin E (composition for 2 ml: Alpha-tocopherol 100 mg).

Or C7b.Vitamin C (composition for 5 ml: Ascorbic acid 1000 mg).

Or C7c.Vitamin A (composition for 2 ml: Retinol 100000 IU).

Figure 6:
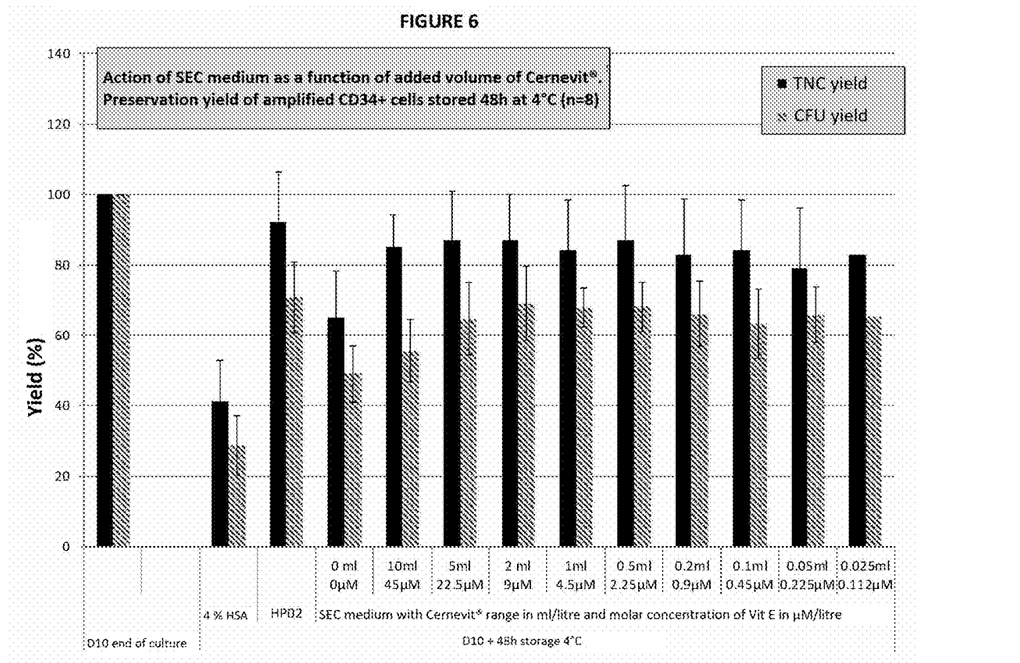

Vitamin E can be used alone or associated with vitamin C or A or a combination of both, with an effect close to or identical to the effect of Cernevit® in terms of preservation of amplified cells. Vitamin C would seem to protect vitamin E. (See FIG. 1, FIG. 3 and FIG. 6)

Product C8: Mannitol (20% solution): this has an antioxidant role (hydroxyl anti-radical and throughout our assays it showed non-significant action. (See FIG. 4)

Product C9: Ringer Lactate (composition: NaCl 6 gr; KCl 0.4 gr; $CaCl_2 2H_2O$ 0.27 gr; Na lactate 5.16 gr qs 1 litre i.e. $Na^+$ 131 mmol; $K^+$ 5 mmol; $Ca^{++}$; Lactate 29 mmol.) It has minor antioxidant action, a small buffer role (idem $CO3^-$ ion) is present in the culture supernatant; throughout our assays, it showed relatively significant action on preservation of the functionality of the amplified cells. (See FIG. 3)

Figure 5:
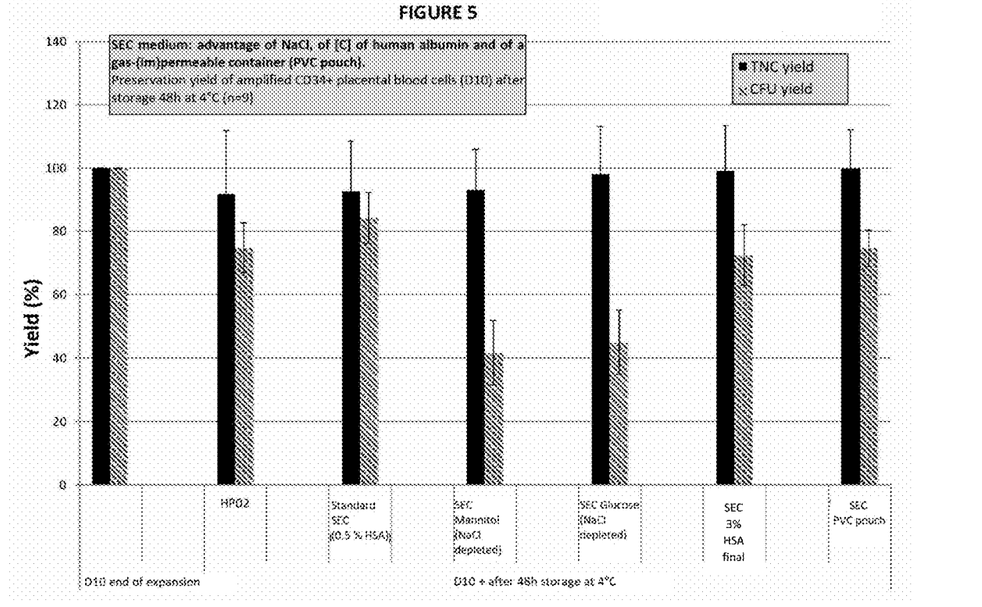

Product C10: NaCl (in the form of 0.9% physiological saline): it plays a solute role and allows the maintaining of physiological osmolarity. Throughout our assays, it proved to be of particular interest on clonogenic potential since, if it is replaced by an isotonic solute of glucose and mannitol, a major drop was observed in clonogenic functionality after storage for 48 h at +4° C. despite the maintained viability of the total nucleated cells. (See FIG. 5)

Product C11: Sodium bicarbonate (1.4% $NaHCO_3$ preparation). It allows the creation of a pseudo-buffer system with the citric acid of ACD A to adjust the pH of the medium to the desired value, and brings dissolved $CO_2$ (protective action on the cells of interest at +4° C.).

Product C12: ACD A (Citric acid Citrate Dextrose Solution A) (Dextrose monohydrate 24.5 g; Citric acid monohydrate 8 gr; sodium citrate dihydrate 22 gr qs 1 litre). It allows adjustment of pH after adding sodium bicarbonate; the citrate ion is described as having antioxidant action, and finally the citrate ion complexes part of the calcium ions introduced to the medium with the Ringer Lactate. ACD A is an anticoagulant conventionally used for transfusion procedure.

The Table below gives the current formulation with the upper and lower values of the activities of interest of the components as evidenced throughout optimisation studies. The following components were not examined for optimisation and only the physiological values were taken into account: KCl (0.33 gr/l final by associating 10% KCL and the KCl contained in the Ringer Lactate), Glucose, NaCl, ACD A.

The preferred pH of the preserving solution is 6.95±0.05.

of SCF (Stem Cell Factor) 100 ng/ml, Flt3 (FMS-like tyrosine kinase-3) 100 ng/ml, G-CSF (Granulocyte Colony Stimulating Factor) 10 ng/ml, and thrombopoietin (TPO) 20 ng/ml at 37° C., 5% $CO_2$ and 85% humidity. At mid-culture, the addition was made of HP01 culture medium with the cytokines (1/5 dilution) and culture continued up to 9 to 12 days (generally 10 days).

After culture, 2.5 ml of cell suspension were transferred to 2.5 ml gas-impermeable polypropylene tubes and centrifuged at 430 g for 10 minutes at 18° C. The supernatant was fully removed (with about 50 µl of supernatant remaining on the cell residue). Then, 2.45 ml of preserving medium to be assayed (at ambient temperature) were added to the tube and the tube sealed with the stopper; the cells being replaced in suspension with successive upturning movements. The samples were left at ambient temperature for 1 to 3 hours. Finally, the tubes were placed flat at +4° C. for times generally of 48 h to 72 h. Assays were also conducted in gas-permeable PVC pouches for comparative studies and in gas-impermeable EVA pouches.

Analyses were performed on the amplified cells: counting and viability of TNCs (Total Nucleated Cells), clonogenic assays, sometimes with counting and viability of CD34+ cells. After the period at +4° C. for the defined times (48 h and 72 h), the cell samples were assayed: counting and

TABLE 2

| Components: injectable preserving preparations | Volume in ml per 1 litre of medium | | | weight in Gr of the molecule(s) of interest per 1 litre of medium | | |
|---|---|---|---|---|---|---|
| | Current value | Upper value | Lower value | Current value | Upper value | Lower value |
| C1. 20% human albumin | 75 | 200 | 25 | 15 | 40 | 5 |
| C2. AA (Vaminolact) | 30 | 50 | 20 | 1.959 | 3.265 | 1.306 |
| C3. 10% KCl | 2.74 | 2.74 | 2.74 | 0.274 | 0.33 | 0.33 |
| C4. 30% Glucose | 3.32 | 3.32 | 3.32 | 1 | 1 | 1 |
| C5. Glutamine (Dipeptiven) | 5.3 | 5.3 | 2.65 | 0.7 | 0.7 | 0.35 |
| C6. 15% MgSO4 | 0.68 | 16 | 0.34 | 0.1 | 2.35 | 0.05 |
| C7. Polyvit (Cernevit) | 2 | 4 | 0.0125 | Vit E: 0.00408 Vit C: 0.05 Vit A: 0.00042 | Vit E: 0.00816 Vit C: 0.1 Vit A: 0.00084 | Vit E: 0.0000255 Vit C: 0.0003125 Vit A: 0.0000026 |
| C8. 20% Mannitol | 25 | 100 | 25 | 5 | 20 | 5 |
| C9. Ringer Lactate | 140 | 513 | 46.7 | Na Lact: 0.722 KCl: 0.056 | Na Lact: 2.647 KCl: 0.205 | Na Lact: 0.24 KCl: 0.0187 |
| C10. 0.9% NaCl | 676.46 | Solute ND | solute ND | 6.09 | ND | ND |
| C11. 1.4% NaHCO3 | 37 | 295 | 18.5 | 0.518 | 4.14 | 0.259 |
| C12. ACD A qs pH 6.95 ± 0.05 | about 2.5 | ND | ND | ND | ND | ND |

Assays on the Action of the Components of the Preserving Medium

1. On Placental Blood CD34+ Cells Selected and then Amplified Ex Vivo.

The cells, after ex vivo expansion, are more fragile than the original CD34+ cells, and the maintaining thereof is most critical at +4° C. (Duchez et al, 2013, supra).

Throughout all the studies leading to the formulation of the biological preserving medium, the assays were conducted on placental blood CD34+ cells derived from a bank with storage at −196° C. Each assay was performed on one 1 or more samples.

The placental blood CD34+ cells were isolated with an immunomagnetic system, then frozen and banked at −196° C.

After thawing, the placental blood CD34+ cells (20000/ml) were placed in culture in HP01 medium in the presence viability of TNCs and clonogenic assays (at times also counting and viability of CD34+ cells).

The quantity of viable total nucleated cells remaining after storage at 4° C. was compared with the quantity of viable total nucleated cells at the end of culture, to obtain a recovery yield of viable cells. Similarly, the yield of CFCs (Colony Forming Cells) was calculated. The values obtained were used to evaluate the advantage of one or more compounds in the formulation and to identify the optimal concentration of these compounds. The values were compared with those obtained with the HP02 preserving medium (Duchez et al, 2013, supra).

Figure 1:
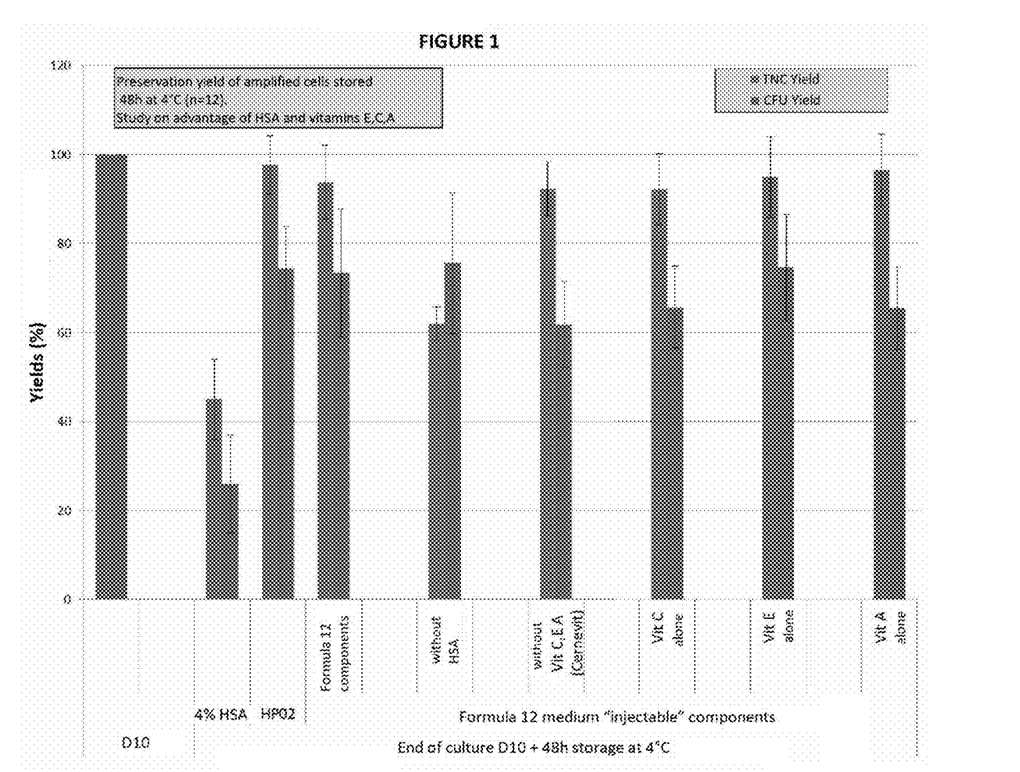

The results are given in FIG. 1.

Figure 8:
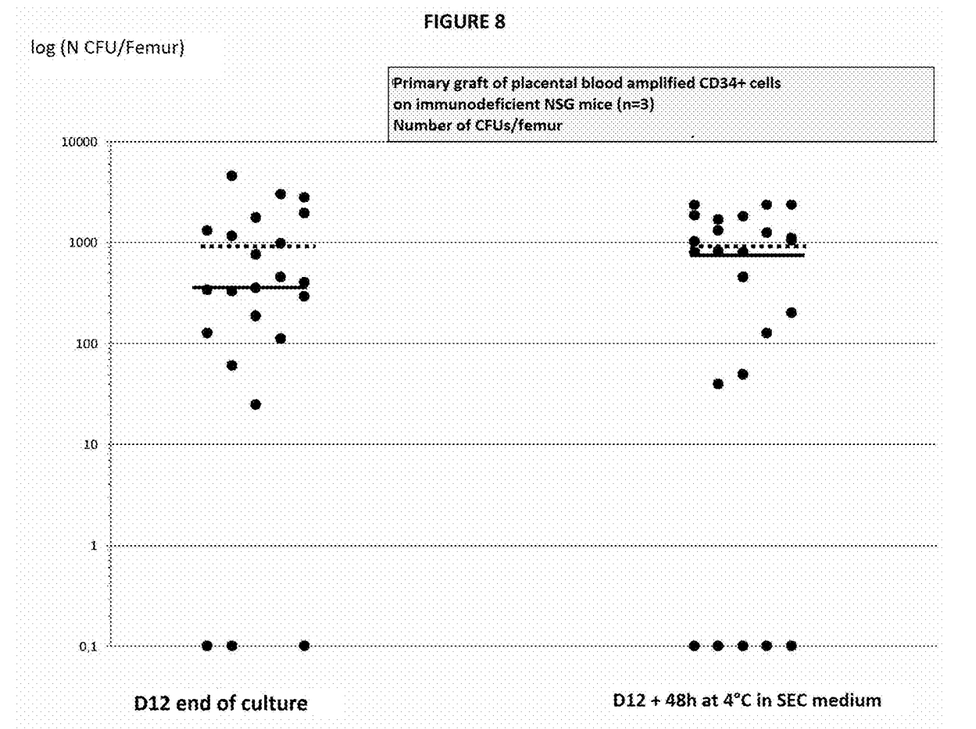

The placental blood CD34+ cells amplified ex vivo were grafted onto NSG immunodeficient mice to examine the preservation of clonogenicity of the amplified CD34+ cells after being stored in SEC medium at +4° C. for 48 h. This study involved different handling steps: production of the graft with the placing in culture of placental blood CD34+ cells (selected by immunomagnetic sorting) in a medium containing a cocktail of adapted cytokines for a period of 12 days. After culture, the amplified cells were harvested and divided into two portions: one portion was grafted onto a batch of immunodeficient mice, each mouse receiving a quantity of amplified cells produced by 1000 CD34+ cells at the beginning of the culture; the other portion was stored in SEC medium (PVC pouch) at +4° C. for 48 h and then injected into a second batch of immunodeficient mice under the same quantitative conditions. 8 weeks after grafting, the mice were sacrificed, and the human clonogenic progenitors were analysed in the bone marrow of the mice: these progenitors are generated by the stem cells (key to graph: 1 circle corresponds to a grafted, analysed mouse (CFU/femur); the dotted line corresponds to the mean; the solid line corresponds to the median). The results show that preservation in SEC medium for 48 h at 4° C. does not modify the number of clonogenic progenitors derived from the stem cells grafted onto the mice.

The results are given in FIG. 8.

2. On Placental Blood Cells after Collection

The placental blood was collected in a plastic pouch (PVC poly-vinyl-chloride) containing 23 ml of CPD anticoagulant (Citrate phosphate dextrose). The placental blood unit was stored at +4° C. awaiting treatment for banking (cryopreservation at −196° C.). The protocol requires that banking is performed within 36 hours to prevent cell deteriorations related to the storage mode (+4° C.) and to absence of preserving medium. To allow collections at far distant sites to meet therapeutic needs (tissue compatibility, rare HLA phenotypes, populations in French overseas departments and territories, etc. . . . ), and requiring transport times longer than 36 h, a first study was conducted to improve preservation of the placental blood unit after collection. It comprised associating a gas-impermeable pouch and the addition of non-injectable medium (HP02 by Macopharma) to a unit of placental blood. This made it possible to obtain a significant improvement in the time before banking (up to 72 h) whilst maintaining viability and functionality compatible with efficient grafting (WO 2014/057220, Chevaleyre et al, 2014, *Stem Cells Dev*, 23, 1820-30).

Figure 2:
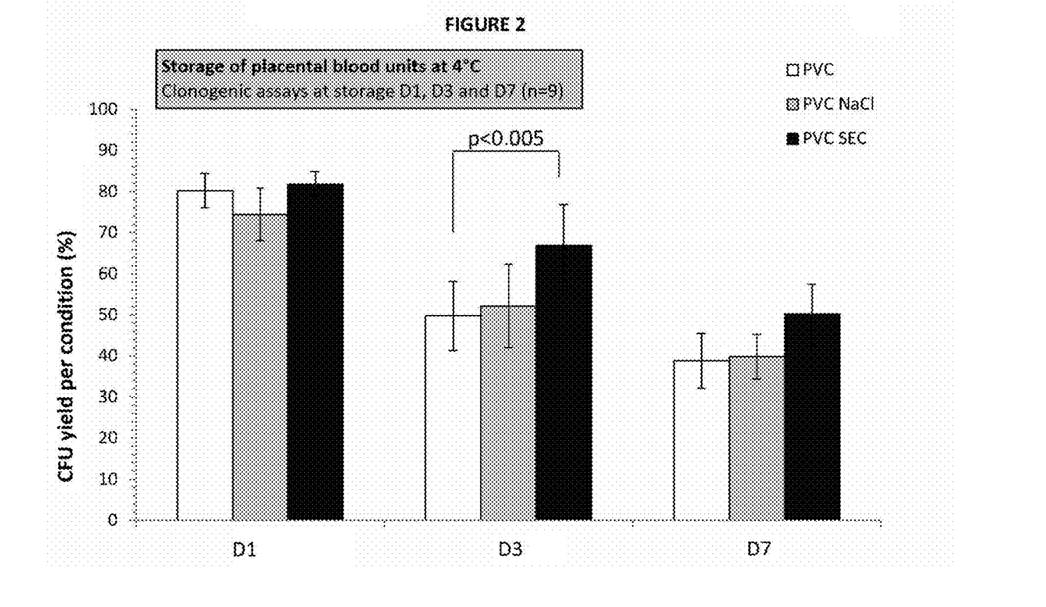
FIG. 2. Preservation of placental blood units after collection, CFU (n=9). D1, D3 and D7 respectively correspond to preservation for 1, 3 or 7 days at 4° C. PVC corresponds to storage in a PVC pouch, PVC NaCl comprises the addition of 0.9% sodium chloride, PVC SEC comprises the addition of SEC medium such as described in the examples in Table 2.

Since the HP02 medium is not injectable, the SEC medium (of the present invention) was used to preserve units of placental blood. After a storage time of 72 h at +4° C., the addition of the SEC medium allowed the maintaining of significantly better functionality compatible with banking (Rodriguez, Master 2 thesis, Université de Bordeaux, presented on 11 Jun. 2014). The results obtained are given in FIG. 2.

3. On Selected Placental Blood CD34+ Cells after Thawing

Figure 10:
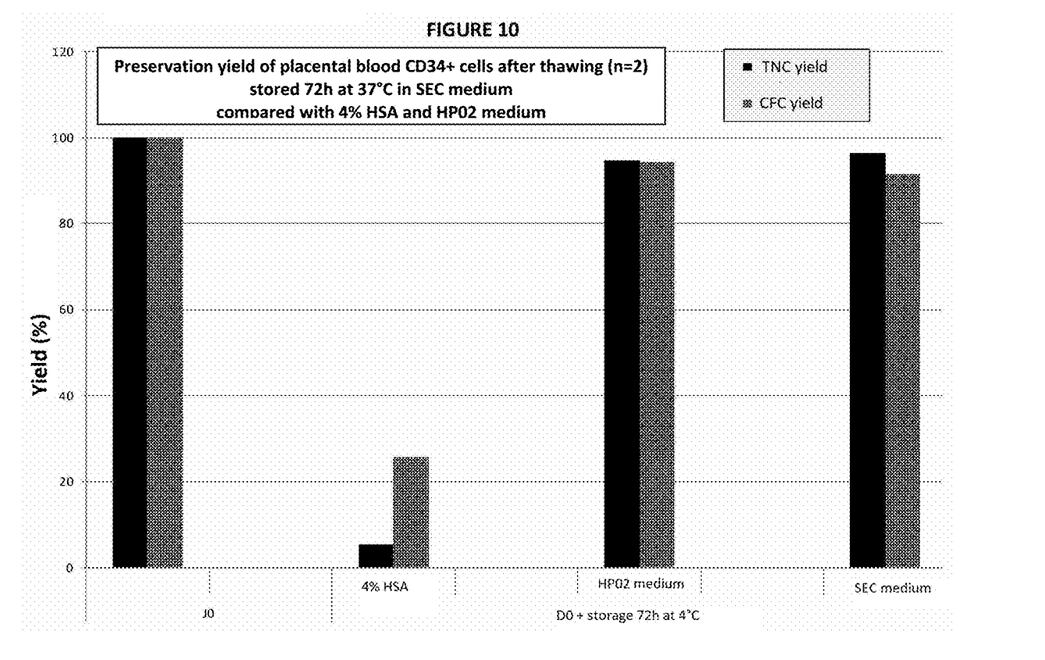
FIG. 10. Preservation yield of the viability and clonogenic potential of CD34+ cells from placental blood. The placental blood CD34+ cells were thawed and divided into 3 aliquots: suspending of the CD34+ cells in SEC medium, in HP02 medium and in 4% human albumin serum, followed by storage at 4° C. After a storage time of 72 h at +4° C., the analyses (counting of total viable nucleated cells and clonogenic functional tests) were carried out. The assays were conducted in gas-impermeable containers (2.5 ml capacity polypropylene tubes containing 2.5 ml of cell suspension for maximum avoidance of the presence of air).

The placental blood CD34+ cells frozen at −196° C. were thawed, washed and divided into 3 aliquots: suspension of CD34+ cells in SEC medium, in HP02 medium and in 4% human albumin, followed by storage at 4° C. After a storage time of 72 h at +4° C., analyses were performed (count of viable total nucleated cells and clonogenic functional assays). The assays were conducted in gas-impermeable containers (2.5 ml polypropylene tubes containing 2.5 ml of cell suspension for maximum avoidance of the presence of air). The results show very good preservation of the CD34+ cells, quantitatively (number of viable cells) and qualitatively (clonogenic functionality) after storage for 72 h at +4° C. in SEC medium compared with the HP02 medium. The results obtained are given in FIG. 10.

4. On Bone Marrow CD34+ Cells after Thawing (n=5)

Figure 9:
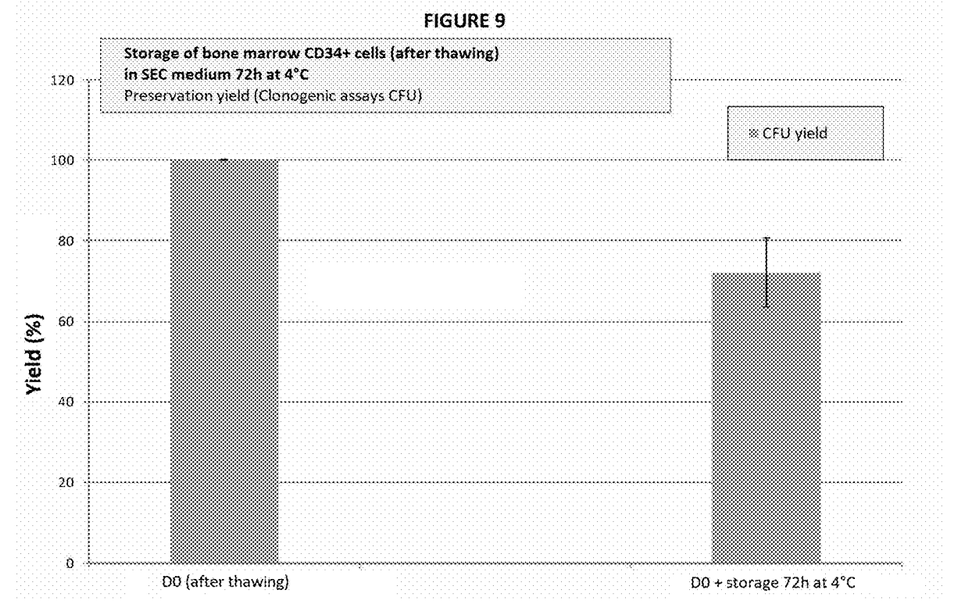
FIG. 9. Preservation yield of the clonogenicity of CD34+ cells (cells of interest) from bone marrow (n=5). The CD34+ cells had been banked in LN2 several years ago (from 3 to 6 years). After thawing, the CD34+ cells were resuspended in SEC medium and stored at 4° C. After a storage time of 72 h at +4° C., clonogenic assays were performed. The assays were performed in gas-impermeable containers (2.5 ml capacity polypropylene tubes containing 2.5 ml of cell suspension for maximum avoidance of the presence of air).

The medullar CD34+ cells banked (frozen at −196° C. for 3 to 6 years), were thawed, washed and resuspended in 2.5 ml of SEC medium in 2.5 ml gas-impermeable polypropylene tubes; they were stored at +4° C. for 72 h. Clonogenic assays performed after thawing and storage for 72 h at 4° C. showed good preservation of the functionality of these medullar cells of interest (preservation yield of functionality >than 70%). The results obtained are given in FIG. 9.

5. On Peripheral Blood Cells Mobilised after Thawing (n=1)

Figure 7:
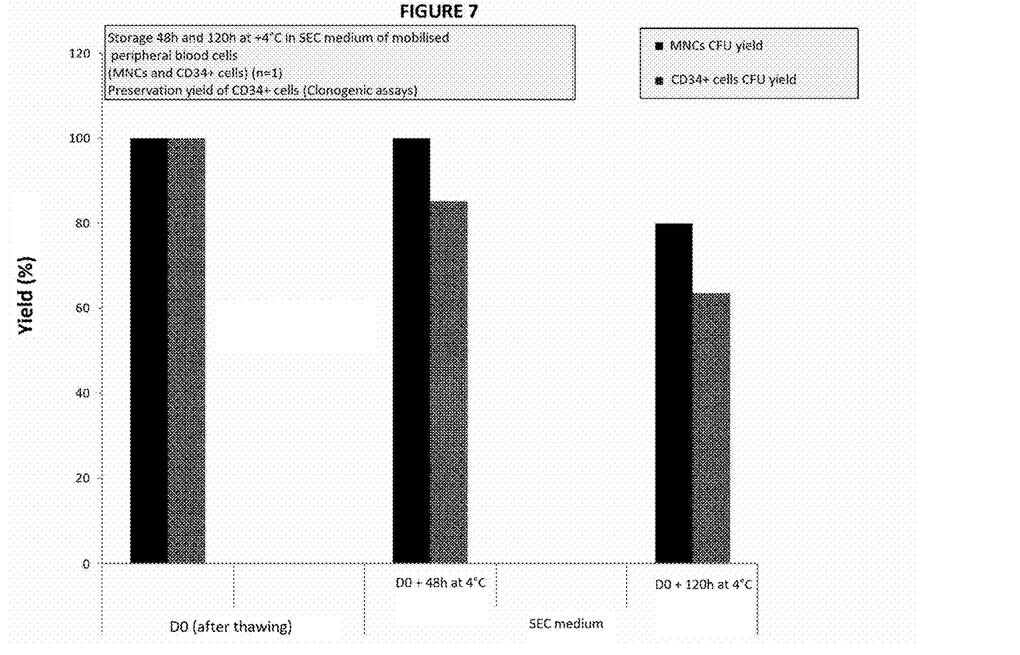
FIG. 7. Preservation yield of the clonogenicity of mononuclear cells (MNCs) and CD34+ cells (after immunomagnetic selection) of peripheral blood mobilised after 48 h and storage time of 120 h at 4° C. (n=1). The MNC cells, after thawing and removal of the cryoprotector, were divided into 2 aliquots one of which was resuspended in SEC medium (components of described Formula 12) and the other treated by immunomagnetic selection to obtain CD34+ cells of purity higher than 80% which were placed in suspension in the same SEC medium (components of described Formula 12). The assays were conducted in gas-impermeable containers (2.5 ml capacity polypropylene tubes containing 2.5 ml of suspension for maximum avoidance of the presence of air).

The peripheral blood cells after Ficoll gradient centrifugation (MNCs) were frozen to −196° C. After thawing and washing, they were divided into 2 aliquots: the first was left as such and the second was subjected to immunomagnetic sorting to obtain a suspension of CD34+ cells. The mononuclear cells (MNCs) and CD34+ cells were suspended in SEC medium (2.5 ml) in gas-impermeable 2.5 ml propylene tubes and stored at +4° C. from 48 to 120 h. The clonogenic assays performed after thawing the MNCs and/or purification of the CD34+ cells and then after storage at 4° C. show good preservation of the functionality of these cells of interest: preservation yield of functionality from 85% (purified CD34+ cells) to 100% (MNCs) after 48 h at +4° C., and from 60% (purified CD34+ cells) to 80% (MNCs) after 120 h at 4° C. The results obtained are given in FIG. 7.

The invention claimed is:

1. An injectable solution for preserving cells, characterized in that it comprises a physiological saline solution of between 5 and 7 g/l sodium chloride and potassium chloride, between 0.05 and 2.4 g/l magnesium sulfate, citric acid, between 0.25 and 4.15 g/l of sodium bicarbonate, between 0.001 and 0.006 g/l of vitamin E, between 0.0002 and 0.0008 g/l of vitamin A, between 0.001 and 0.1 g/l of vitamin C, between 0.3 and 0.7 g/l of glutamine, between 5 and 20 g/l of human albumin and between 0.2 and 2.7 g/L of lactate, wherein the solution with the cells is injectable to a subject without the need for washing the cells and the solution does not comprise HEPES, sodium pyruvate or phosphate buffer.

2. The injectable solution according to claim 1, further comprising one or more elements selected from additional amino acids other than glutamine, glucose and mannitol.

3. The injectable solution according to claim 1, characterized in that it further comprises additional amino acids other than glutamine, glucose and mannitol.

4. A kit comprising the injectable preserving solution according to claim 1 and a sterile container for receiving cells from placental blood, from bone marrow and from peripheral blood.

5. A sterile container for receiving cells from placental blood, from bone marrow and from peripheral blood comprising the injectable preserving solution according to claim 1.

6. The container according to claim 5, characterized in that it further comprises cells from placental blood, from bone marrow and from peripheral blood.

7. The container according to claim 6, characterized in that the cells comprise CD34+cells.

8. A method for preserving cells from placental blood, from bone marrow and from peripheral blood, comprising the contacting of cells from placental blood, from bone marrow and from peripheral blood with the injectable solution according to claim 1.

9. The method according to claim 8, characterized in that the cells comprise CD34+cells.

10. The injectable solution according to claim 1, said solution further comprising cells from placental blood, bone marrow or peripheral blood.

11. The injectable solution according to claim 10, said cells being CD34+.

12. The injectable solution according to claim 1, further comprising between 1 and 25 g/L mannitol.

13. The injectable solution according to claim 1, characterized in that it comprises less than 10% by weight of components other than sodium chloride, potassium chloride, magnesium sulfate, citric acid, sodium bicarbonate, vitamin E, vitamin A, glutamine, human albumin, lactate, vitamin C, amino acids other than glutamine, glucose and mannitol.

\* \* \* \* \*